(No Model.)
R. JACKS.
COMBINED PRUNING, CLIPPING, AND HOLDING IMPLEMENT.
No. 569,284. Patented Oct. 13, 1896.
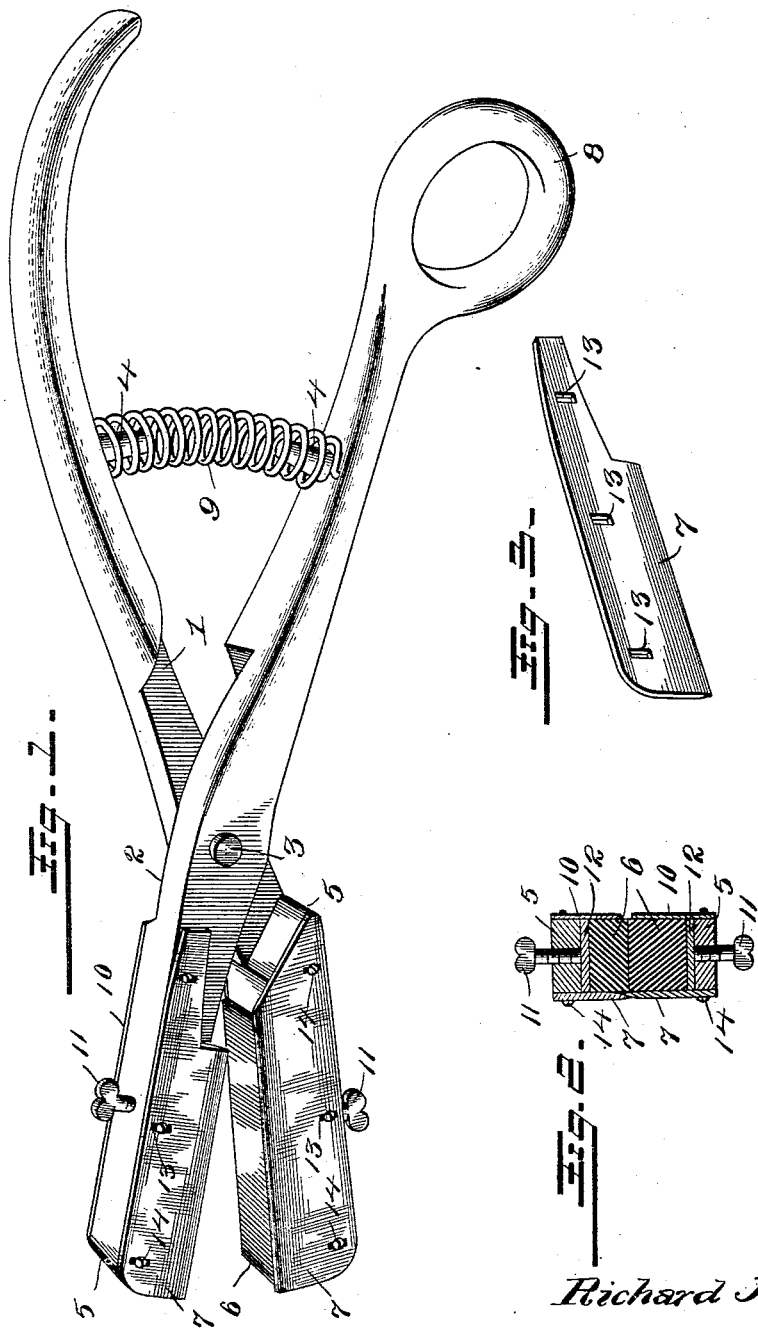
Witnesses
H. J. Koerth.
V. B. Hillyard.
Inventor
Richard Jacks,
By his Attorneys,
C. A. Snow & Co.
THE NORRIS PETERS CO., PHOTO-LITHO., WASHINGTON, D. C.

UNITED STATES PATENT OFFICE.

RICHARD JACKS, OF QUINCY, CALIFORNIA.

COMBINED PRUNING, CLIPPING, AND HOLDING IMPLEMENT.

SPECIFICATION forming part of Letters Patent No. 569,284, dated October 13, 1896.

Application filed October 26, 1895. Serial No. 566,992. (No model.)

*To all whom it may concern:*

Be it known that I, RICHARD JACKS, a citizen of the United States, residing at Quincy, in the county of Plumas and State of California, have invented a new and useful Combined Pruning, Clipping, and Holding Implement, of which the following is a specification.

The present invention aims to provide an implement for cutting flowers, the stems of fruit and plants, and for pruning, and at the same time holding the flowers, fruit, &c., without mashing or otherwise injuring the stems, which is the chief cause of premature decay. Implements having these objects in view have been devised; but the stem-holding devices, while adapted to yield bodily, present rigid and inflexible surfaces in direct engagement with the stems and work injury thereto, and the said holding devices are not capable of adjustment to the size of the stem. Hence the stems are more or less injured and require subsequent clipping to prevent permanent injury to the stems, as of fruit, when the latter is to be packed for future use.

The present invention aims to combine with the jaws of pruning and cutting implements strips or blocks of rubber or similar elastic substance, into which the stem of the fruit, plant, or flower will become embedded and thereby be wholly protected from the injury resulting from gripping the stem between inflexible and rigid surfaces.

A further purpose of the invention is to combine with the elastic strips or blocks provisions for adjusting the same so as to insure the firm and positive gripping of the stems after the latter have been severed; also, in adjustably connecting the blades with the jaws, whereby the cutting edges may be caused to project to a greater or less distance beyond the gripping-faces of the said elastic strips or blocks.

The improvement consists in certain details and combinations of the parts, which hereinafter will be more fully set forth, illustrated, and pointed out in the claims.

In the accompanying drawings is illustrated an embodiment of the invention, although slight changes in the details and arrangement may be resorted to without departing from the vital principles of the invention, and in said drawings—

Figure 1 is a perspective view of an implement constructed in accordance with this invention. Fig. 2 is a cross-section of the jaws. Fig. 3 is a detail view of one of the blades.

The implement comprises two levers 1 and 2, which are pivotally connected at 3, and which have inwardly-extending teats or projections 4, and which have their ends extended beyond the pivot 3 to provide jaws 5, to which are fitted the elastic gripping strips or blocks 6 and the cutting-blades 7. One of the levers, as 2, has its end formed into a ring 8, through which a finger of the hand is passed to prevent the possible slipping of the implement when using the same, and the end of the opposite lever, as 1, is curved for the thumb or hand to obtain a purchase upon when operating the device. A coil-spring 9 is interposed between the levers 1 and 2 and is retained in place by having its ends fitted to the teats or projections 4, and this spring serves to separate the jaws and the levers.

The jaws 5 are similarly constructed and are recessed in their inner faces so as to receive the elastic gripping strips or blocks 6, which latter are retained in place by frictional engagement with the sides of plates 10 and the cutting-blades 7, which parts are secured to the opposite sides of the respective jaws and form a space into which the gripping strips or blocks are pressed. Set-screws 11 pass through the jaws 5 and serve to move the gripping strips or blocks outward a proper distance to insure their positive engagement with the stems of fruit, flowers, &c., and in order to transmit the pressure of the set-screws to the said gripping strips or blocks the latter are backed by metallic plates 12.

The cutting-blades 7 are adjustably connected with their respective jaws and have elongated openings 13, through which extend the binding-screws 14, by means of which the said cutting-blades are secured to the jaws in their located and adjusted position. Thus it will be seen that provision is made for adjusting the cutting-blades to compensate for the wear incident to the sharpening of the said blades and for the wearing away of the elastic gripping strips or blocks.

When using the implement, the cutting-blades face the vine, plant, or bush from which the fruit, flower, &c., is to be cut.

Hence when the jaws are together the stem is gripped between the elastic strips or blocks and is so held after the cutting has been effected until the jaws are released to permit the deposit of the fruit, flower, &c., into a suitable receptacle. The stem is embedded in the yielding and elastic surfaces of the strips or blocks, and is held firmly thereby without any possible resultant injury thereto, and the embedding of the stem in the elastic gripping-surfaces insures the proper holding of the stem in the desired direction, which result cannot be attained by inelastic and rigid gripping-surfaces, as will be readily understood.

Having thus described the invention, what is claimed as new is—

1. In a pruning or cutting implement, the combination of oppositely-disposed jaws, plates secured to one side of the jaws and projecting a short distance from their inner faces, cutting-blades fitted to the opposite side of the jaws and projecting from their inner faces about parallel with the said plates, elastic gripping strips or blocks frictionally held in the spaces formed between the respective cutting-blades and plates, backing-plates interposed between the elastic strips and the jaws' and set-screws operating in threaded openings of the jaws to relatively adjust the said elastic gripping-strips, substantially as set forth.

2. A pruning or cutting implement comprising levers pivoted together and having their end portions extended beyond the pivotal connection to form jaws, plates secured to one side of the jaws and extending a short distance from their inner faces, cutting-blades adjustably connected with the opposite side of the jaws and extending beyond their inner faces parallel with the said plates, elastic gripping strips or blocks frictionally held in the spaces formed between the plates and cutting-blades, backing-plates interposed between the jaws and the rear side of the elastic strips, and set-screws operating in the jaws to project the elastic gripping-strips to a greater or less distance from the jaws, substantially in the manner set forth for the purpose described.

In testimony that I claim the foregoing as my own I have hereto affixed my signature in the presence of two witnesses.

RICHARD JACKS.

Witnesses:
M. H. STROUT,
W. S. DEAN.